(12) United States Patent
Covington

(10) Patent No.: US 9,723,781 B1
(45) Date of Patent: Aug. 8, 2017

(54) STAND ON MOWER WITH PEDESTAL HANDLE DECK HEIGHT CONTROL

(71) Applicant: Charles Bradley Covington, Batesville, AR (US)

(72) Inventor: Charles Bradley Covington, Batesville, AR (US)

( * ) Notice: Subject to any disclaimer, the term of this patent is extended or adjusted under 35 U.S.C. 154(b) by 0 days.

(21) Appl. No.: 14/813,812

(22) Filed: Jul. 30, 2015

Related U.S. Application Data

(63) Continuation-in-part of application No. 14/045,376, filed on Oct. 3, 2013, now abandoned.

(51) Int. Cl.
| | |
|---|---|
| *A01D 34/74* | (2006.01) |
| *A01D 34/81* | (2006.01) |
| *B60G 7/00* | (2006.01) |
| *A01D 101/00* | (2006.01) |

(52) U.S. Cl.
CPC ............. *A01D 34/74* (2013.01); *A01D 34/81* (2013.01); *B60G 7/001* (2013.01); *A01D 2101/00* (2013.01)

(58) Field of Classification Search
CPC .... A01D 34/81; A01D 34/74; A01D 2101/00; B60G 7/001

USPC .......................................................... 280/834
See application file for complete search history.

(56) References Cited

U.S. PATENT DOCUMENTS

| | | | |
|---|---|---|---|
| 3,044,239 A | 7/1962 | Harkness | 56/25.4 |
| 3,485,314 A | 12/1969 | Herr | 180/19 |
| 5,653,466 A | 8/1997 | Berrios | 280/760 |
| 5,765,347 A | 6/1998 | Wright et al. | 56/14.7 |
| 5,809,756 A | 9/1998 | Skag et al. | 56/10.8 |
| 6,205,753 B1 | 3/2001 | Velke et al. | 56/14.7 |
| 6,490,849 B1 | 12/2002 | Scag et al. | 56/16.7 |
| 6,688,090 B2 | 2/2004 | Velke et al. | 56/14.7 |
| 6,782,964 B1 | 8/2004 | Korthals et al. | 180/273 |
| 8,141,886 B1 | 3/2012 | Sugden et al. | 280/32.5 |
| 8,262,104 B2 | 9/2012 | Kallevig et al. | 280/32.7 |
| 2003/0106297 A1* | 6/2003 | Melone | A01D 34/64 56/15.8 |
| 2015/0359173 A1* | 12/2015 | Wright | A01D 34/74 56/17.1 |

* cited by examiner

*Primary Examiner* — Tony Winner
*Assistant Examiner* — Felicia L Brittman
(74) *Attorney, Agent, or Firm* — Keisling & Pieper PLC; Trent C. Keisling

(57) ABSTRACT

A stand on mower including a pedestal with a deck height adjustment lever positioned adjacent the pedestal for operator use while standing behind the pedestal. A cross yoke, height position lock, and floating height mechanisms are also taught for mounting the deck off of the mower frame.

4 Claims, 4 Drawing Sheets

STAND ON MOWER WITH PEDESTAL HANDLE DECK HEIGHT CONTROL

CROSS-REFERENCE TO RELATED APPLICATIONS

Not Applicable.

STATEMENT REGARDING FEDERALLY SPONSORED RESEARCH OR DEVELOPMENT

Not Applicable.

REFERENCE TO A MICROFICHE APPENDIX

Not Applicable.

RESERVATION OF RIGHTS

A portion of the disclosure of this patent document contains material which is subject to intellectual property rights such as but not limited to copyright, trademark, and/or trade dress protection. The owner has no objection to the facsimile reproduction by anyone of the patent document or the patent disclosure as it appears in the Patent and Trademark Office patent files or records but otherwise reserves all rights whatsoever.

BACKGROUND OF THE INVENTION

1. Field of the Invention.

The present invention relates to improvements in stand on mowers. More particularly, the invention relates to improvements particularly suited for providing an improved operator position and deck adjustment using a deck height handle side mounted on the pedestal of a stand on mower.

2. Description of the Known Art.

As will be appreciated by those skilled in the art, stand on mowers are known in various forms. Patents disclosing information relevant to mowers include:

U.S. Pat. No. 5,765,347, issued to Wright, et al. on Jun. 16, 1998 entitled Power mower with riding platform for supporting stand-operator with an abstract that states: A zero-turning-radius power lawn mower for operation by a standing-occupant includes first and second independently driven and controlled rear drive wheels mounted on separate drive axles. A riding platform for supporting the standing-occupant or operator is located between the first and second rear drive wheels. The rear drive wheels are independently driveable in both the forward and reverse directions at variable speeds so as to allow for substantially zero-radius-turning of the mower about a central turning point The riding platform is positioned at this turning point so that the standing-occupant remains substantially unaffected by centrifugal force created during approximate zero-radius-turning of the mower thereby allowing the mower to take such turns at higher speeds. Such positioning of the platform also provides for improved maneuverability, reduces the likelihood that the platform will bottom out when the mower goes over bumps, and creates a safer mower less susceptible to tipping due to the resulting low center of gravity. The low center of gravity created by the position of the riding platform for the standing-operator also results in the mower having improved traction and being less likely to pop "wheelies" upon acceleration.

U.S. Pat. No. 5,809,756, issued to Scag, et al. on Sep. 22, 1998 entitled Lawn mower usable in both riding and walk-behind modes with an abstract that states: A powered lawn mower having a frame, an engine mounted to the frame, a set of front wheels and rear wheels connected to the frame, a drive for transmitting rotational power from the engine to the rear wheels, and grass cutting blades associated with the frame, and powered by the engine. A platform is positioned behind the rear wheels, and is capable of supporting an operator while the lawn mower is operating. The platform and the other parts are connected to the frame in such a way and positioned so that the addition of the operator in a stand-up or riding position moves the center of gravity by no more than twenty-five percent of the wheelbase of the mower. The rear wheel set may be positioned up or down but is not swingable. Alternatively, the platform and the other parts are connected to the frame in such a way and positioned so that the total weight of the mower is distributed no more than thirty-five percent on the front wheels with no operator on the platform, and the total weight of the mower is no less than twenty percent on the front wheels with an average operator riding on the platform.

U.S. Pat. No. 6,205,753, issued to Velke, et al. on Mar. 27, 2001 entitled Power lawn mower with stand-on and sit-down modes with an abstract that states: A self-propelled power lawn mower for operation by an operator. The operator can operate the mower while standing on a foot platform, or alternatively when sitting down on a selectively deployable seat. Thus, the mower includes both sitting and standing modes. In certain embodiments, at least a portion of the foot platform is located between first and second rear drive wheels. The rear drive wheels are independently driveable in both forward and reverse directions at variable speeds so as to allow for approximate zero radius turning of the mower about a vertical turning axis. The foot platform is positioned near this vertical axis so that the operator when standing may he substantially unaffected by centrifugal force created during approximate zero radius turning of the mower.

U.S. Pat. No. 6,490,849, issued to Scag, et al. on Dec. 10, 2002 entitled Lawn mower with a platform for a standing operator with an abstract that states: A powered lawn mower having a frame, an engine mounted to the frame, a set of front wheels and a set of rear drive wheels connected to the frame. Attached to the rear of the frame is a standing platform positioned in front of the rear wheel axles so that the center of gravity is moved forward over the center of the mower with an operator standing on the platform. The positioning of the platform substantially improves the stability and safety of the mower. The platform, capable of supporting the weight of a standing operator, is mounted to the frame of the mower with a plurality of springs mounted between the platform and the frame to cushion the ride of the operator. The mower may also include as seat assembly removably attachable to the frame of the mower and positioned substantially above the platform. The seat assembly includes an attachment mechanism designed to be removably attached to the frame, so that an operator can choose between a standing position and a seated position.

U.S. Pat. No. 6,782,964, issued to Korthals, et al. on Aug. 31, 2004, entitled Mower with an abstract that states: A platform included as part of a mower, the platform providing a surface upon which an operator stands while operating the mower. The platform is springably or suspendably mounted on the frame of the mower to cushion the operator and thereby decrease the amount of physical exertion which may be experienced by the operator over long periods of operation. The platform is further associated with a power control mechanism operatively connected with the platform whereby operation of the mower attachment(s) are selectively controllable by the operator stepping onto or off of the platform.

U.S. Pat. No. 6,688,090, issued to Velke, et al. on Feb. 10, 2004 entitled Power mower with riding platform for supporting standing operator with an abstract that states: A zero turning radius power lawn mower for operation by a standing occupant includes first and second independently driven and controlled rear drive wheels mounted on separate drive axles. A riding platform for supporting the standing occupant or operator is located between the first and second rear drive wheels. The rear drive wheels are independently driveable in both the forward and reverse directions at variable speeds so as to allow for substantially zero radius turning of the mower about a central turning point. The riding platform is positioned near this turning point or axis so that the standing occupant remains substantially unaffected by centrifugal force created during approximate zero radius turning of the mower thereby allowing the mower to take such turns at higher speeds. The low center of gravity created by the position of the riding platform for the standing operator also results in the mower having improved traction and being less likely to pop "wheelies" upon acceleration.

U.S. Pat. No. 8,141,886, issued to Sugden, et al. on Mar. 27, 2012 entitled Selectively extendible operator's platform for stand-on lawnmower with an abstract that states: A selectively deployable extender is provided on the rear of a platform assembly of a stand-on lawnmower so as to permit an operator to position his or her feet further from the rear wheels than would otherwise be possible in order to increase operator comfort and/or to improve traction and/or maneuverability. By making the platform selectively deployable as opposed to simply providing a longer platform, the length of the machine can be reduced for storage and transport, and the risk of making damaging contact with an obstruction or with the ground while traveling up a hill is reduced. The extender may, for instance, be a plate or similar device pivotally attached to a rear end of a main platform and the main platform can be resiliently mounted to or at least partially isolated from a frame of the stand-on lawnmower.

Each of these patents is hereby expressly incorporated by reference in their entirety.

From these prior references it may be seen that these prior art patents are very limited in their teaching and utilization, and an improved mower is needed to overcome these limitations.

SUMMARY OF THE INVENTION

The present invention is directed to an improved stand on mower using a deck height adjustment handle for adjusting deck height with the handle positioned on the side of the operating pedestal so that the operator can adjust deck height from the operating position. In accordance with one exemplary embodiment of the present invention, a deck height handle is provided using a yoke, gas assist spring, and floating adjustment apertures to control the deck height while minimizing operator input force and allowing the deck to float over uneven ground. These and other objects and advantages of the present invention, along with features of novelty appurtenant thereto, will appear or become apparent by reviewing the following detailed description of the invention.

BRIEF DESCRIPTION OF THE SEVERAL VIEWS OF THE DRAWINGS

In the following drawings, which form a part of the specification and which are to be construed in conjunction therewith, and in which like reference numerals have been employed throughout wherever possible to indicate like parts in the various views.

DETAILED DESCRIPTION OF THE INVENTION

Figure 1:
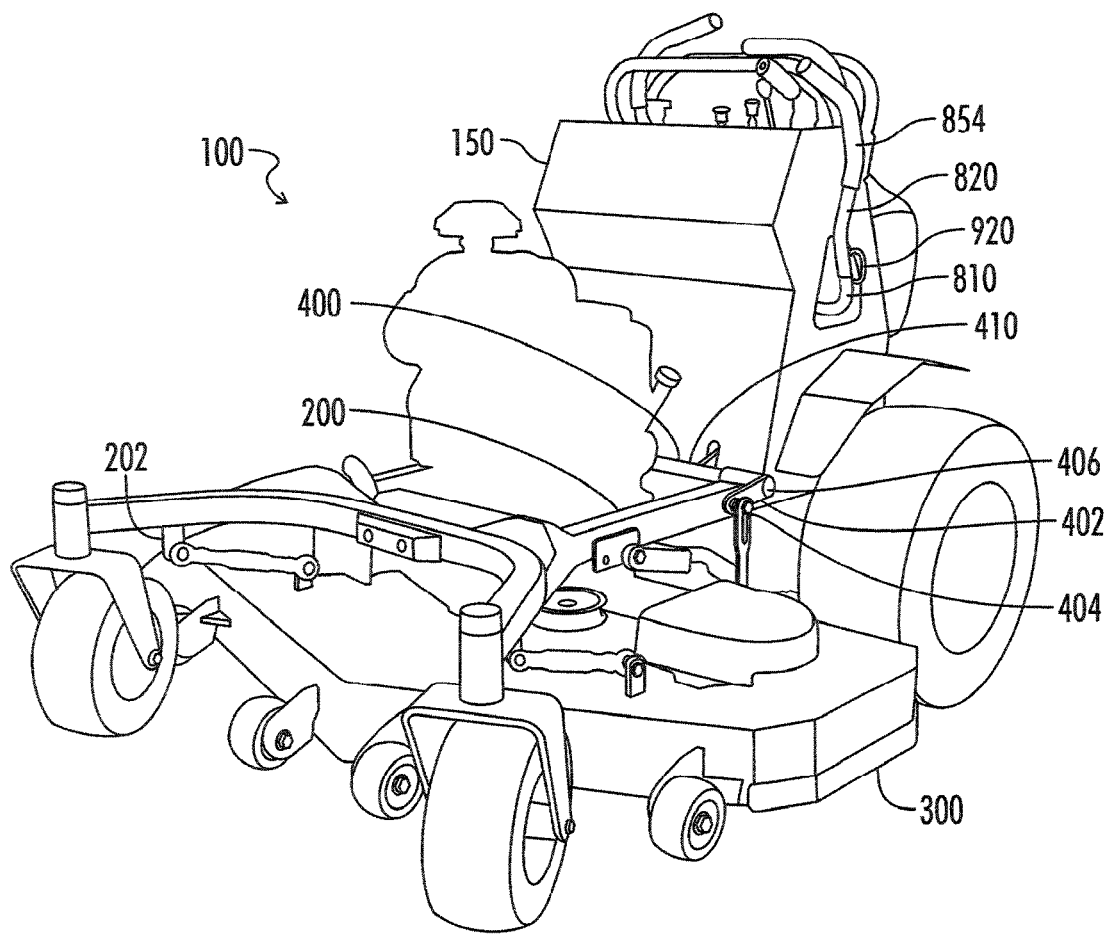
FIG. 1 of the drawings shows a stand on mower with a control pedestal.

As shown in FIG. 1 of the drawings, the present invention is directed to a lever controlled suspension deck 300 on a stand on mower 100 that can be manipulated while the mower operator is standing behind the control pedestal 150. The stand on mower is built off of a mower main frame 200.

Figure 2:
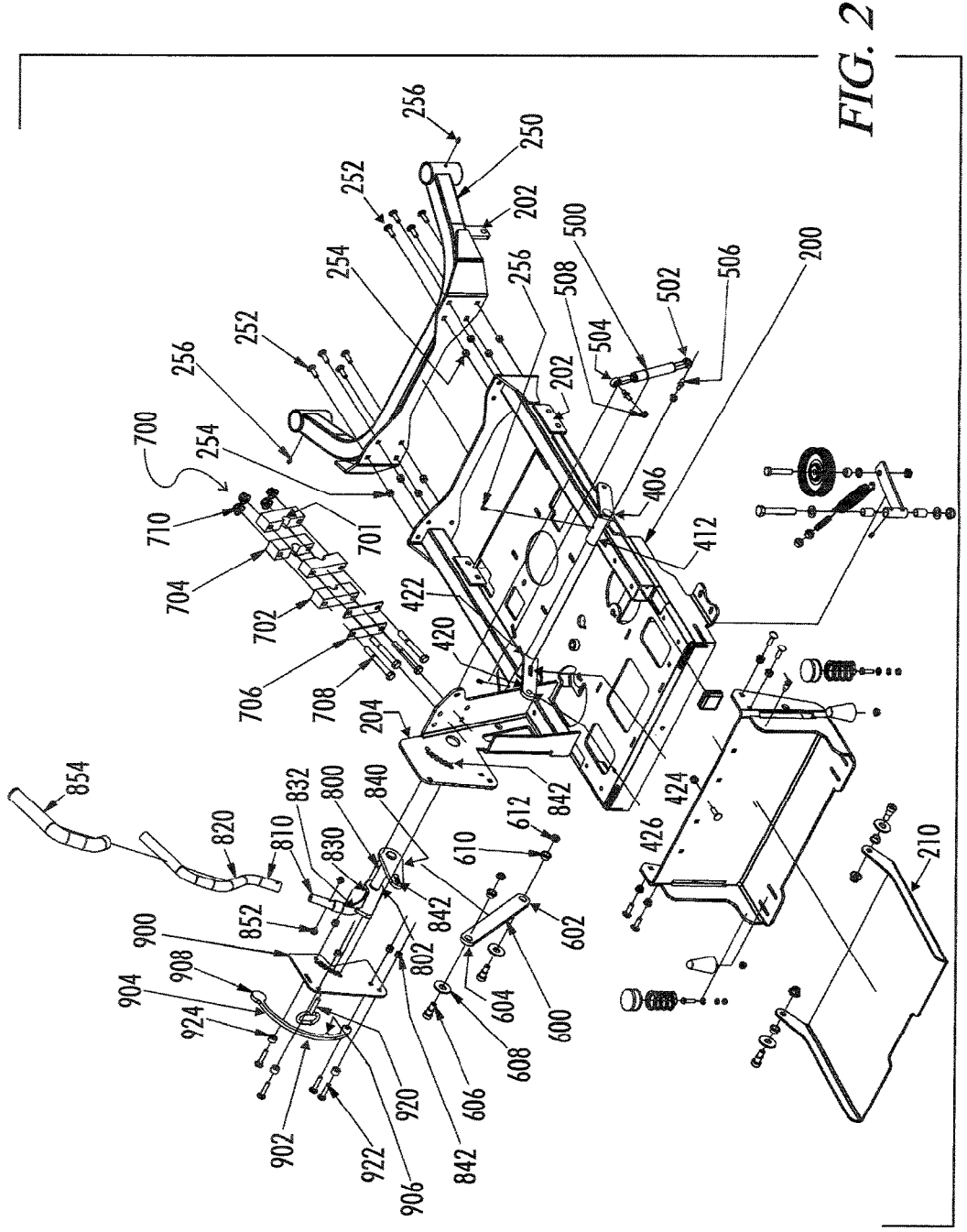
FIG. 2 shows a mower frame and components for supporting the deck height adjustment handle.

As shown in FIG. 2 of the drawings, the mower main frame 200 supports four top deck pivot mounts 202 for mounting the mower deck 300, an upper handle support body 204 for mounting of the deck lift lever assembly 800 and a stand on platform 210. A front wheel frame 250 is secured with frame bolts 252 and frame nuts 254 to the main frame 200. Grease fittings 256 are mounted where appropriate to lubricate the moving parts.

Figure 3:
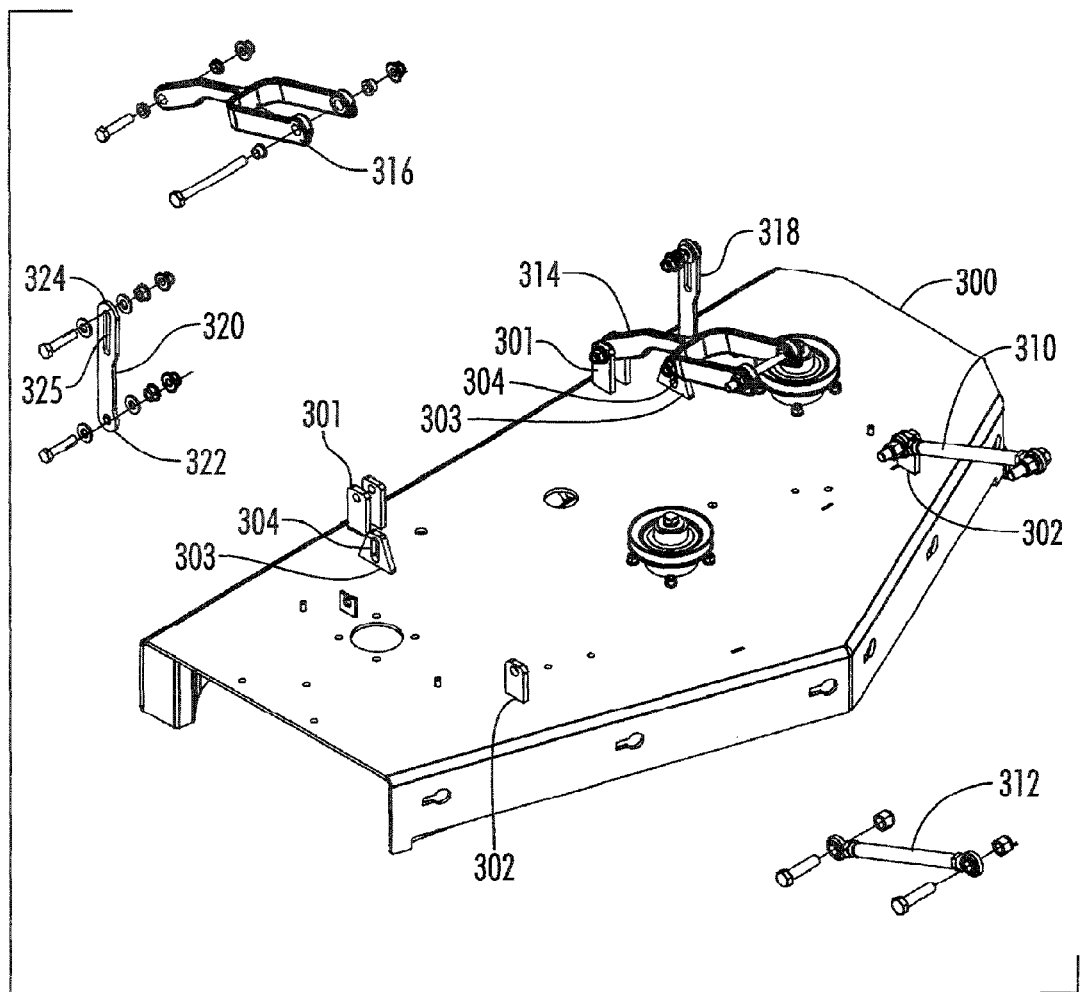
FIG. 3 shows a mower deck with hanging arms and deck height adjustment bars.
Figure 4:
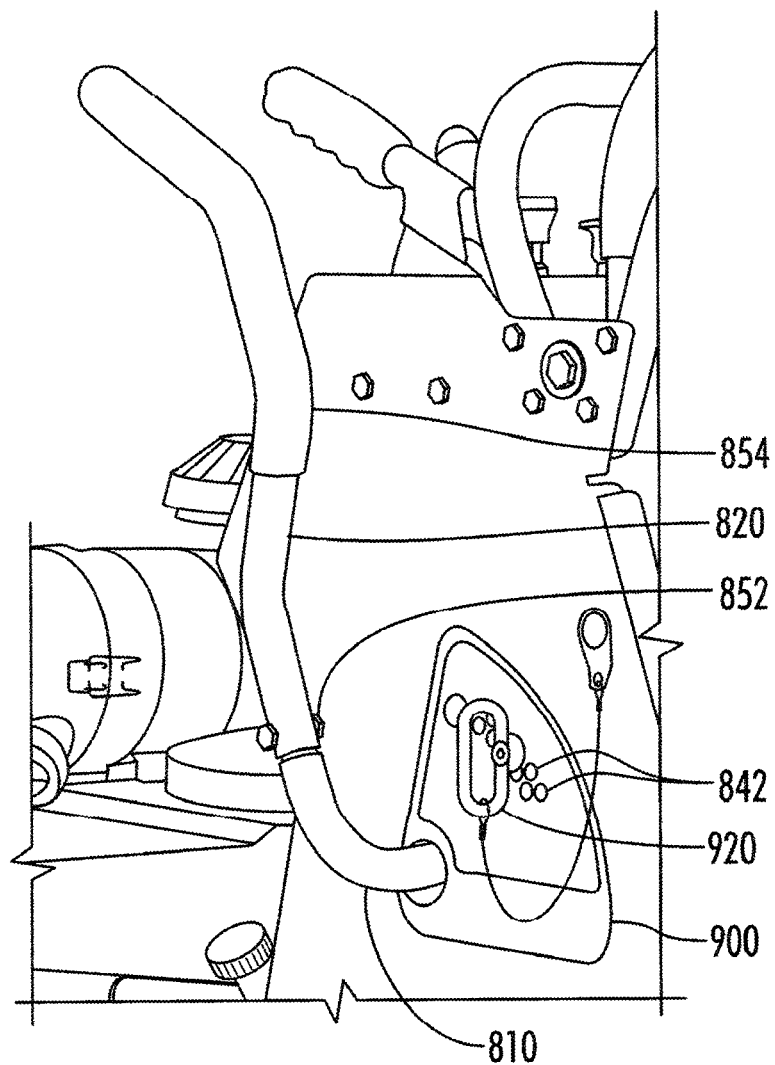
FIG. 4 shows a magnified view o f the side of the mower pedestal with the deck height adjustment handle.

As best understood in FIG. 1 and partially shown in both FIGS. 2 and 3, the suspension mower deck 300 includes two back slot pivot mounts 301 and two front bottom pivot mounts 302. The four bottom pivot mounts 301, 302 are used to pivotally connect to the bottom ends of the left front suspension arm 310, right front suspension arm 312, left back suspension arm 314, and right back suspension arm 316. The top ends of the arms 310, 312, 314, 316 are pivotally connected to the top deck pivot mounts 202 on the main frame 200. In this manner, the deck 300 is moveably hung from the main frame 200.

As best understood from FIGS. 1 and 3, the height of the mower deck 300 is controlled by the left deck connection bar 318 and right deck connection bar 320. Each bar 318, 320 has a bar deck end 322 connected into the elongated aperture 304 in the bottom height mount 303. The elongated aperture 304 allows for slight adjustments to the deck height range.

Each bar 318, 320 also has a bar yoke end 324 slideably and pivotally connected into the elongated floating bar aperture 325 in the lower arm linkage pivot end 404 on the lower yoke arm 402 of the cross yoke 400. Because the deck is secured by the suspension arms 310, 312, 314, 316 the suspension deck 300 can now float freely due to the sliding engagement of the lower arm linkage pivot end 404 to the elongated floating bar aperture 325. The floating deck allows for the avoidance of lawn scalping problems that occur with rigidly mounted cutting decks.

Returning to FIGS. 1 and 2, the cross yoke 400 allows both sides of the mower deck 300 to be lifted equally. The cross yoke 400 has a yoke rod 410 that support left and right lower yoke arms 402 with each arm 402 including a lower arm linkage pivot end 404 pivotally connected to the bar yoke ends 324 and a lower arm rod end 406 welded to the yoke rod 410. The yoke rod 410 is pivotally mounted in the rod pivot 412. The yoke rod 410 also has an upper yoke arm 420 fixed to the central body of the yoke rod 410 at the upper arm rod end 422. The upper yoke arm 420 also defines a central cylinder aperture 424 and has an upper arm handle pivot end 426.

A two hundred pound operating force or appropriately sized gas spring 500 is used to assist in lifting the deck 300. The gas spring 500 includes a spring arm end 502 mounted to the central cylinder aperture 424 and a spring frame end 504 mounted with a spring ball stud 506 and spring stud nut 508 to the upper handle support body 204.

The upper yoke arm 420 is pivotally connected at the upper arm handle pivot end 426 to the bar yoke end 602 of the height linkage bar 600. The height linkage bar 600 is connected at the upper bar handle end 604 to the inner lift aperture 844 on the deck lift extension 840 of the deck lift lever assembly 800. The height linkage bar 600 is connected with a linkage shoulder bolt 606, linkage washer 608, linkage bushing 610, and linkage nut 612.

An arm mount block 700 is used to mount the deck lift lever assembly 800 off of the upper handle support body 204. The arm mount block 700 uses male pillow blocks 702 and female pillow block 704 held together with block straps 706 secured with block bolts 708 and block nuts 710 to the upper handle support body 204. The arm mount block 700 includes a central aperture 701 to pivotally mount the rotating handle rod 802 of the deck lift lever assembly 800.

The deck lift lever assembly 800 is built off of a rotating handle rod 802 to mount a handle arm 810, arm extension 820, a lock extension 830, and a deck lift extension 840.

The handle arm extension 820 is mounted to the handle arm 810 with a connection bolt 852. A rubber handle grip 854 is mounted to the upper end for operator comfort. The handle arm extension 820 should be long enough to overcome the weight of the deck 300 as supplemented by the lifting force of the gas spring 500.

The lock extension 830 is constructed with a catch finger 832 for engaging the lever lock arm 902 at the retention finger 906 on the curved body 904 to secure the deck 300 in an upper position. The curved body 904 extends to a gravity ball end 908 to keep the catch finger 832 engaged until force is applied to the handle 820 to release the fingers 832, 906.

A height lever pin 920 can be used to engage the lock extension 830 by way of height apertures 842 in the height adjustment plate 900, and height apertures 842 in the handle support body 204 to lock the deck 300 in position. The height adjustment plate 900 is mounted with plate bolts 922 and spacers 924 to the handle support body 204.

Reference numerals used throughout the detailed description and the drawings correspond to the following elements:
Stand on mower 100
Control pedestal 150
Mower main frame 200
Top deck pivot mount 202
Upper handle support body 204
Stand on platform 210
Front wheel frame 250
Frame bolt 252
Frame nut 254
Grease fitting 256
Suspension deck 300
Bottom front pivot mount 302
Bottom back slot pivot mount 301
bottom height mount 303
elongated aperture 304
Left front suspension arm 310
Right front suspension arm 312
Left back Y suspension arm 314
Right back Y suspension arm 316
Left deck connection bar 318 Right deck connection bar 320
Bar deck end 322
Bar yoke end 324
Elongated floating bar aperture 325
Cross yoke 400
Lower yoke arm 402
Lower arm linkage pivot end 404
Lower arm rod end 406
Yoke rod 410
Rod pivot 412
Upper yoke arm 420
Upper arm rod end 422
Upper arm cylinder aperture 424
Upper arm handle pivot end 426
Gas spring 500
Spring arm end 502
Spring frame end 504
Spring ball stud 506
Spring stud nut 508
Height linkage bar 600
Bar yoke end 602
Bar handle end 604
Linkage Shoulder bolt 606
Linkage Washer 608
Linkage Bushing 610
Linkage nut 612
Arm mount block 700
Male pillow block 702
Female pillow block 704
Block strap 706
Block bolt 708
Block nut 710
Deck lift lever assembly 800
a rotating handle rod 802
handle rod 810
Handle arm extension 820
Lock extension 830
Catch finger 832
Deck lift extension 840
Height apertures 842
Inner lift aperture 844
Connection bolt 852
Handle grip 854
Height adjustment plate 900
Lever lock arm 902
Curved body 904
Retention finger 906
Gravity ball end 908
Height lever pin 920
Plate bolt 922
Spacer 924

From the foregoing, it will be seen that this invention well adapted to obtain all the ends and objects herein set forth, together with other advantages which are inherent to the structure. It will also be understood that certain features and subcombinations are of utility and may be employed without reference to other features and subcombinations. This is contemplated by and is within the scope of the claims. Many possible embodiments may be made of the invention without departing from the scope thereof. Therefore, it is to be understood that all matter herein set forth or shown in the accompanying drawings is to be interpreted as illustrative and not in a limiting sense.

When interpreting the claims of this application, method claims may be recognized by the explicit use of the word 'method' in the preamble of the claims and the use of the 'ing' tense of the active word. Method claims should not be interpreted to have particular steps in a particular order unless the claim element specifically refers to a previous element, a previous action, or the result of a previous action. Apparatus claims may be recognized by the use of the word 'apparatus' in the preamble of the claim and should not be interpreted to have 'means plus function language' unless the word 'means' is specifically used in the claim element. The words 'defining,' 'having,' or 'including' should be interpreted as open ended claim language that allows additional elements or structures. Finally, where the claims recite "a" or "a first" element of the equivalent thereof, such claims should be understood to include incorporation of one or more such elements, neither requiring nor excluding two or more such elements.

What is claimed is:

1. A stand on mower apparatus operated by a user, the apparatus comprising:
   a mower frame;
   a control pedestal mounted above the mower frame;
   a mower deck moveably connected below the mower fame;
   a deck height adjustment handle positioned adjacent the pedestal, the deck height adjustment handle pivotally supported by the mower frame;
   a yoke operably connected to the handle;
   a connection arm operably connecting the yoke to the mower deck;
   a left front suspension arm pivotally connected to the mower frame and also pivotally connected to the mower deck;
   a right front suspension arm pivotally connected to the mower frame and also pivotally connected to the mower deck;
   a left back suspension arm pivotally connected to the mower frame and also pivotally connected to the mower deck;
   a right back suspension arm pivotally connected to the mower frame and also pivotally connected to the mower deck; and
   the left back suspension arm including a Y shaped configuration.

2. A stand on mower apparatus operated by a user, the apparatus comprising:
   a mower frame;
   a control pedestal mounted above the mower frame;
   a mower deck moveably connected below the mower fame;
   a deck height adjustment handle positioned adjacent the pedestal, the deck height adjustment handle pivotally supported by the mower frame;
   a yoke operably connected to the handle;
   a connection arm operably connecting the yoke to the mower deck;
   a left front suspension arm pivotally connected to the mower frame and also pivotally connected to the mower deck;
   a right front suspension arm pivotally connected to the mower frame and also pivotally connected to the mower deck;
   a left back suspension arm pivotally connected to the mower frame and also pivotally connected to the mower deck;
   a right back suspension arm pivotally connected to the mower frame and also pivotally connected to the mower deck; and
   the right back suspension arm including a Y shaped configuration.

3. A stand on mower apparatus operated by a user, the apparatus comprising:
   a mower frame;
   a control pedestal mounted above the mower frame;
   a mower deck moveably connected below the mower fame;
   a deck height adjustment handle positioned adjacent the pedestal, the deck height adjustment handle pivotally supported by the mower frame;
   a yoke operably connected to the handle;
   a connection arm operably connecting the yoke to the mower deck
   a handle rod connected to the deck height adjustment handle;
   a lock extension including a catch finger;
   a deck lift extension defining extension height apertures;
   a height adjustment plate defining plate height apertures;
   the mower frame including an upper handle support body;
   the upper handle support body defining body height apertures; and
   a height lever pin inserted into the extension height apertures, the body height apertures, and the plate height apertures.

4. A stand on mower apparatus operated by a user, the apparatus comprising:
   a mower frame;
   a control pedestal mounted above the mower frame;
   a mower deck moveably connected below the mower fame;
   a deck height adjustment handle positioned adjacent the pedestal, the deck height adjustment handle pivotally supported by the mower frame;
   a yoke operably connected to the handle;
   a connection arm operably connecting the yoke to the mower deck
   a handle rod connected to the deck height adjustment handle;
   a lock extension including a catch finger;
   a deck lift extension defining extension height apertures;
   a lever lock arm pivotally mounted off of the mower frame,
   the lever lock arm including a retention finger positioned to selectively engage the catch finger; and
   the lever lock arm including a gravity ball end for gravity biasing the retention finger into engagement with the catch finger.

* * * * *